United States Patent [19]

Cayzer

[11] Patent Number: 4,701,989
[45] Date of Patent: Oct. 27, 1987

[54] PIPE AND FLANGE ALIGNMENT TOOL

[76] Inventor: Ian S. Cayzer, 6211 Silver Springs NW, Calgary, Alberta, Canada, T3B 3E5

[21] Appl. No.: 891,620

[22] Filed: Aug. 1, 1986

[51] Int. Cl.⁴ .............................................. B23K 37/04
[52] U.S. Cl. ....................................... 29/271; 269/48.1
[58] Field of Search .............. 269/43, 48.1; 29/281.5, 29/271, 272

[56] References Cited

U.S. PATENT DOCUMENTS

| | | | |
|---|---|---|---|
| 963,603 | 7/1910 | Lunceford | 269/48.1 |
| 1,448,528 | 3/1923 | Elliott | 29/272 |
| 2,080,906 | 5/1937 | Boyer . | |
| 2,226,078 | 12/1940 | Spahn | 269/48.1 |
| 2,615,413 | 10/1952 | Adams et al. . | |
| 2,736,286 | 2/1956 | Britton . | |
| 3,031,995 | 5/1962 | Taylor | 269/48.1 |
| 3,092,058 | 6/1963 | Feeler | 29/272 |
| 3,330,021 | 7/1967 | Jacobsen . | |
| 3,742,186 | 6/1973 | Finkel et al. | 269/48.1 |
| 4,582,241 | 4/1986 | Johnson | 269/48.1 |

FOREIGN PATENT DOCUMENTS 629929 10/1961 Canada .

Primary Examiner—Robert C. Watson
Attorney, Agent, or Firm—Marcus L. Bates

[57] ABSTRACT

A manually operated tool for aligning a flange to one end of a pipe so that the flange and pipe can be properly oriented in aligned relationship respective to one another and welded together. The tool is comprised of two spaced, rotatable mandrels which can be moved axially independently to one another within a cylindrical body. A first and second set of radial blades extend through the main body and are moved radially in response to axial movement of the spaced mandrels. The outer edge portion of one set of blades engages the internal surface of the pipe, while the outer edge portion of the other set of blades engage the inner surface of the flange. This permits the flange to be axially aligned and properly oriented respective to and independently of the pipe so that the pipe and flange can subsequently be tack welded, the tool removed from the interior of the flange and pipe, and the weld completed to thereby provide a unique method of attaching a flange to a pipe end.

13 Claims, 9 Drawing Figures

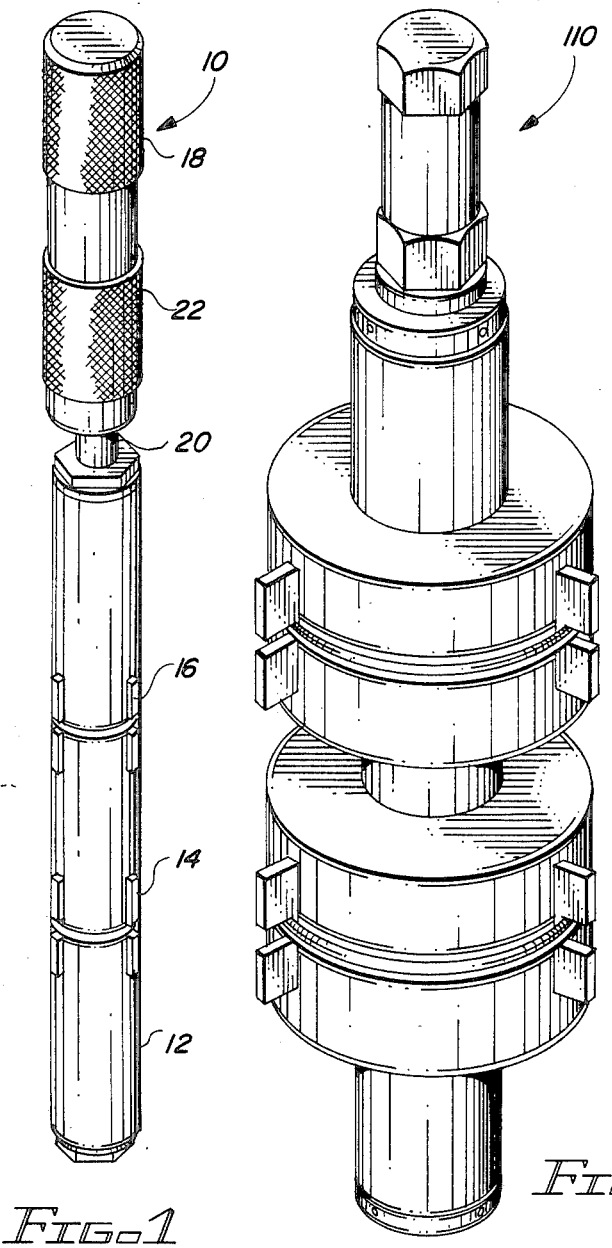
Fig.1
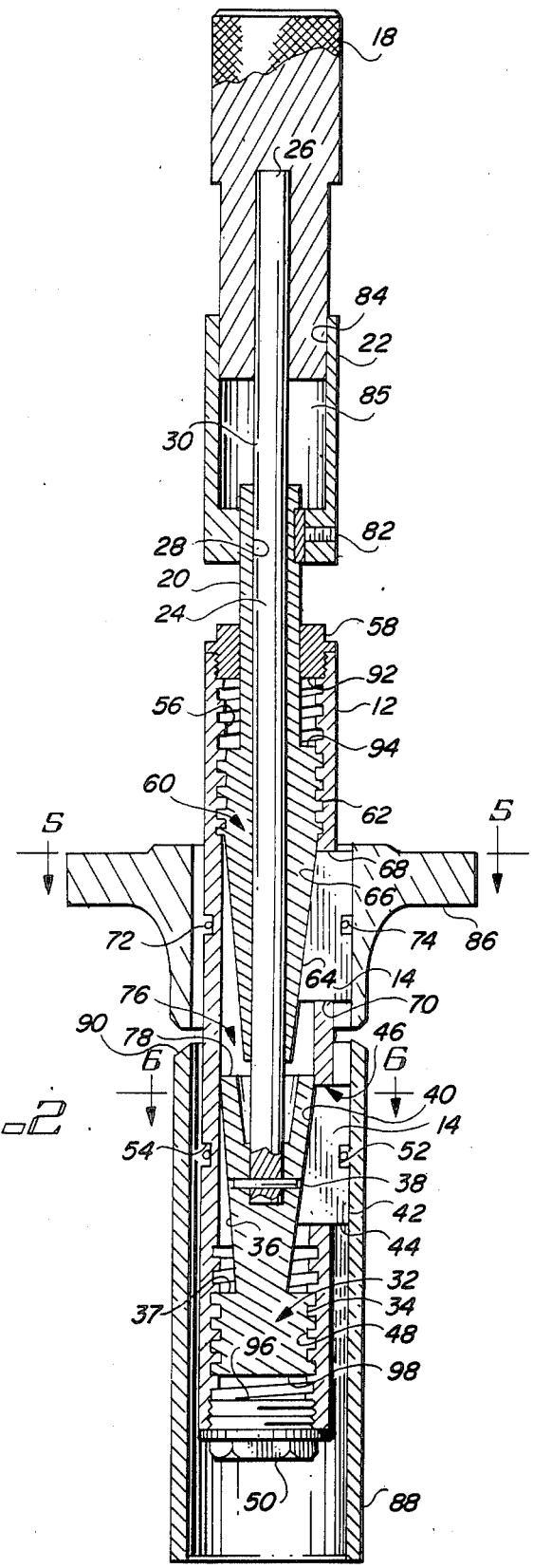
Fig.2
Fig.4
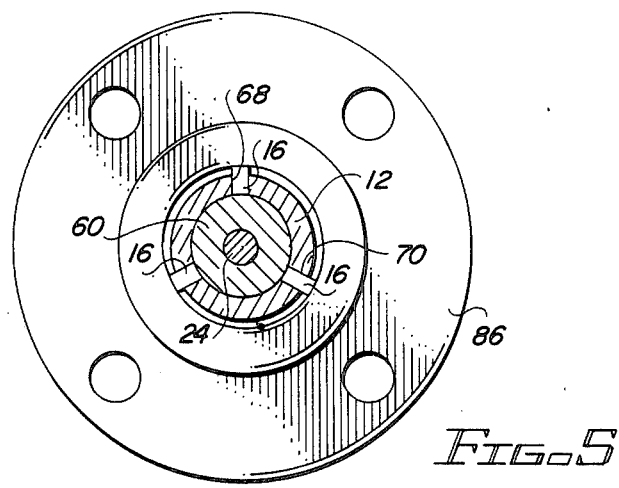
Fig.5

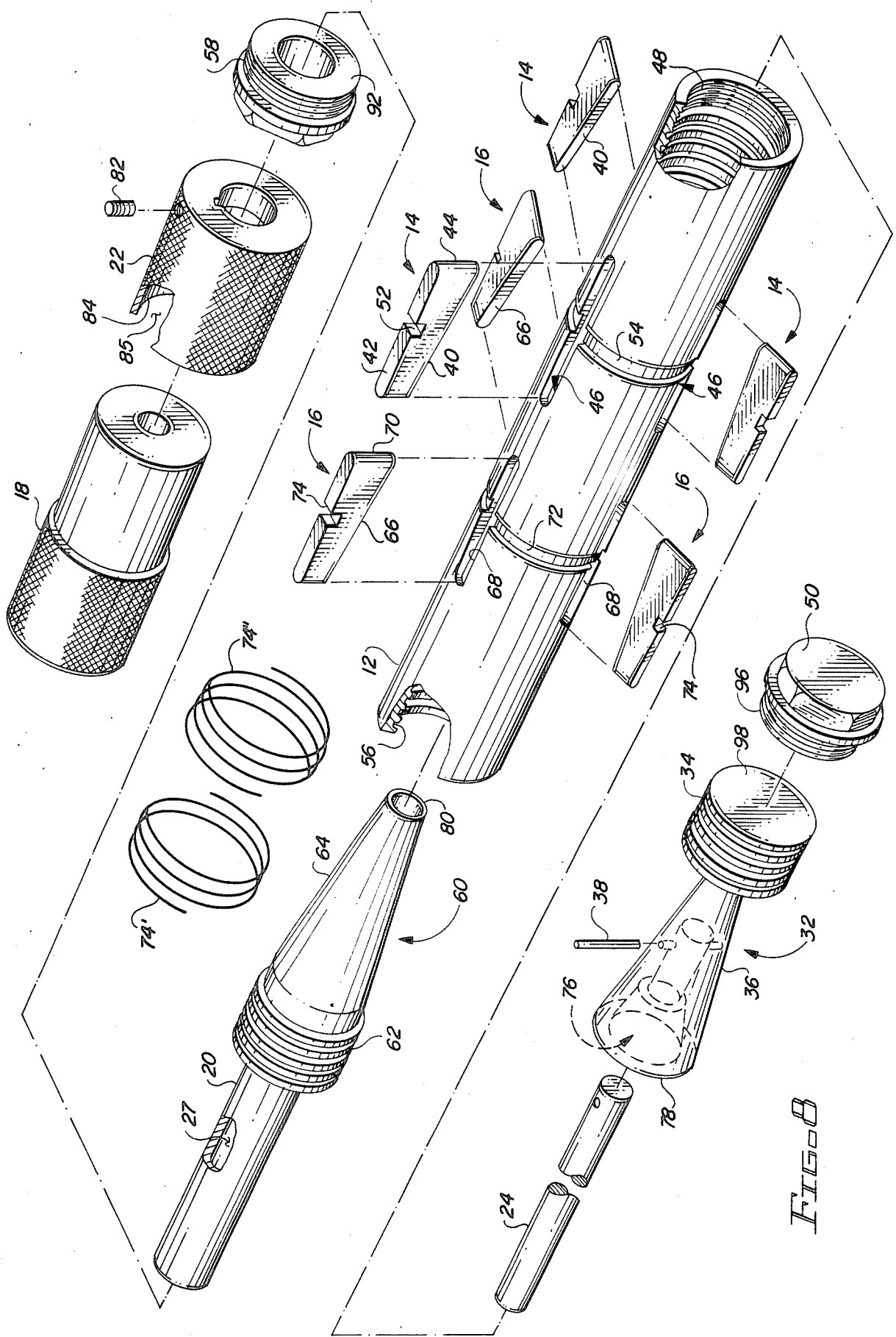

PIPE AND FLANGE ALIGNMENT TOOL

BACKGROUND OF THE INVENTION

This invention relates to a manually operated tool of a configuration to be received internally of a pipe and pipe flange for holding the flange in axial alignment with respect to the pipe to facilitate the pipe and flange being welded together. Prior art flange aligners employ a one stage principle for expansion and operates to expand simultaneously into contact with the bore of both the flange and the pipe. Accordingly, the expansion member first contacts the smaller diameter bore, whichever it may be, then as the tool is further expanded contact is made with the larger diameter bore. Such an operation makes it difficult to properly position the flange respective to the pipe because the flange and pipe are being simultaneously engaged by the tool. This type of aligner is not at all satisfactory for aligning flanges to pipe ends wherein large differences in the internal bore between the flange and pipe are encountered.

For example, in pressure vessel construction, the pipe is often of a heavier schedule than the pipe flange to be welded thereon, and accordingly, the internal diameter differences preclude the satisfactory use of many prior art flange aligners.

Accordingly, it would be desirable to have made available a flange aligner having a two stage alignment apparatus, one stage for engaging the pipe independently of a second stage for engaging the flange. With such an apparatus, either the flange or the pipe can first be engaged by the appropriate engaging apparatus, and thereafter the flange can be properly oriented respective to the pipe prior to setting the second stage of the apparatus.

Large pipe flanges weigh several hundred pounds and are very difficult to properly bring into axial alignment and orientation with a pipe. Accordingly, should one be able to secure a flange aligner tool first within the pipe, the flange can subsequently be mounted on the second stage apparatus and the weld gap and flange holes easily set and oriented since the tool now supports the heavy flange. This assures accurate and proper alignment of the flange with respect to the pipe end prior to welding. This also makes it possible to accurately choose the optimum gap between the confronting ends of the flange and pipe.

A tool that achieves the above desirable attributes and overcomes the drawbacks of the prior art is the subject of the present invention.

PRIOR ART STATEMENT

Jacobsen U.S. Pat. No. 3,330,021 teaches a pipe lining tool. Spaced shoe members 8 and 24 are simultaneously moved when wheel 4 rotates at threads 3. Jacobsen is the type of pipe lining tool that Applicant's contribution represents an improvement thereover for the reason that Applicant's shoes are independently moved into contact with the flange and pipe.

Adams et al U.S. Pat. No. 2,615,413 is somewhat similar to Jacobsen in many respects because it is a single stage expansion tool for retracting or extending the illustrated shoes 24, 24, 62.

Britton U.S. Pat. No. 2,736,286 illustrates two coacting members of which are telescopingly received one within the other. The members are conical in shape and serve to hold a flange to a pipe. The apparatus of Britton obviously has little to do with Applicant's contribution.

Boyer U.S. Pat. No. 2,080,906 shows a pipe lining tool having blades 17 spaced from one another and radially arranged respective to the main housing thereof. The blades 17 bear against inner member 19 and are forced radially outwardly whenever the crank 29 is actuated. Accordingly, Boyer '906 is a single stage apparatus that simultaneously extends the blade into engagement with the pipe and flange, rather than individually as set forth in Applicant's present claims.

Canadian Patent No. 629,929, 10-31-61, to Taylor discloses confronting cones that simultaneously engage expander member 26 for simultaneously engaging flange 14 and pipe 10. Since this is a single stage operation, it is not anticipatory of Applicant's contribution.

SUMMARY OF THE INVENTION

A flange aligner tool for aligning the bore of a flange with the bore of a pipe so that the flange and pipe can be properly welded together in aligned relationship. The tool has an elongated body with there being opposed marginal ends. Spaced radially arranged extensible pipe engaging means extend from one marginal end of said main body for engaging the interior of a pipe; and a second spaced radially arranged extensible flange engaging means extends from the other marginal end of said main body for engaging the interior of a flange.

Means are attached to said main body for independently extending said pipe engaging means and said flange engaging means, whereby: the interior of a marginal end of a pipe can be engaged with the novel pipe engaging means, and thereafter a flange can be positioned on the flange engaging means, so that the flange and pipe are releasably attached to one another in axial aligned relationship and the flange and pipe can therefore be welded together.

The main body of this invention preferably is cylindrical and includes two axially spaced sets of circumferentially spaced windows formed through a sidewall thereof. The flange engaging means are radially extending blades and each blade reciprocatingly extends through a window and moves in response to axial movement of a mandrel.

Another set of circumferentially spaced windows receive a pipe engaging set of blades therethrough, and the pipe engaging blades are extended radially outwardly in response to axial movement of another mandrel.

The flange mandrel is actuated by a cylindrical knob located adjacent to the outer end of the main body. The flange mandrel includes a threaded surface which threadedly engages a medial length of the inner surface of the main body. The flange mandrel terminates in a conical surface against which a sloped edge of the blade member is slidably received so that axial movement of the flange mandrel forces the flange engaging blades to be extended or retracted through the radial windows.

The pipe mandrel has a marginal length which threadedly engages a medial length of the main body and includes a conical portion which bears against a sloped portion of the pipe engaging blades. A circular knob is connected to a central shaft which extends through the flange mandrel and into attached relationship respective to the pipe mandrel so that rotation of the knob moves the mandrel axially.

Accordingly, one end of the tool is inserted into the pipe bore and the pipe mandrel is moved axially until the pipe engaging blades contact the inside peripheral surface of the pipe. The tool is located with the flange blades positioned exteriorly of the pipe. The flange is next positioned about the flange engaging blades, and the flange mandrel is moved axially by manipulating the flange knob until the flange engaging blades contact the inside peripheral surface of the flange bore thereby releasably locking the flange and pipe together. The flange engaging blades can be loosened to enable repositioning of the flange until the flange is properly oriented respective to the pipe, whereupon the two are welded together, and then the tool is removed from the interior of the flange and pipe.

A primary object of the present invention is the provision of a two stage flange aligner tool wherein the stages independently engage a pipe and a flange so that a pipe can be engaged with one stage of the tool and thereafter the flange positioned on the tool and subsequently engaged by the other stage, and then welded to the pipe, whereupon the tool is then removed from the pipe and flange.

Another object of this invention is the provision of a flange aligner comprising an elongated tool having a marginal end for releasably engaging the interior of a pipe and an opposed marginal end for releasably engaging a flange so that the tool can be selectively attached to either the flange or pipe, the flange and pipe can then be properly oriented respective to one another and then welded together; and, then the tool is removed from the welded pipe and flange.

A still further object of this invention is the provision of a flange alignment tool for precisely aligning a flange respective to the end of a pipe, wherein the alignment tool includes spaced mandrels which actuate spaced sets of blades, wherein the blades are radially spaced respective to the mandrels, and the sets of blades independently engage a pipe and a flange.

Another and still further object of this invention is the provision of a flange aligner comprising a main body axially received within a flange to be welded to a pipe, with there being an extensible pipe engaging means and an extensible flange engaging means which are independently actuated for releasably engaging a pipe and a flange.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 1 is a perspective side view of a flange aligner tool made in accordance with the present invention;

FIG. 2 is a perspective side view of another embodiment of a flange aligner tool made in accordance with the present invention;

FIG. 4 is an enlarged, longitudinal, cross-sectional view of the apparatus disclosed in FIGS. 1 and 3;

FIGS. 5 and 6, respectively, are cross-sectional views taken along lines 5—5 and 6—6, respectively, of FIG. 4;

FIG. 8 is an exploded view of the tool disclosed in FIG. 1; and,

DETAILED DESCRIPTION OF THE PREFERRED EMBODIMENT

Figure 3:
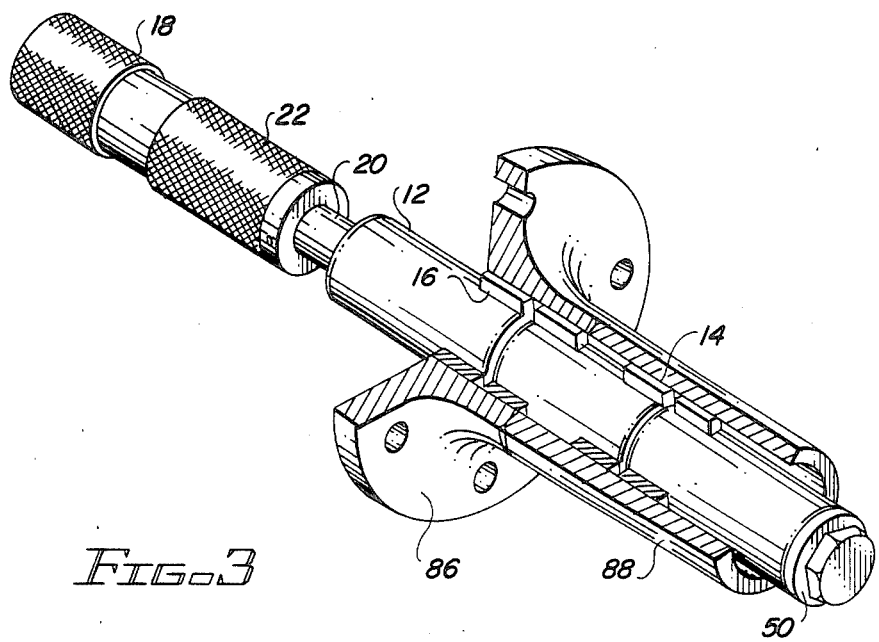
FIG. 3 is a perspective side view which shows the tool of FIG. 1 operatively connected to a pipe and flange to be welded together; part of the pipe and flange have been removed and the remaining parts in cross-section.
Figure 6:
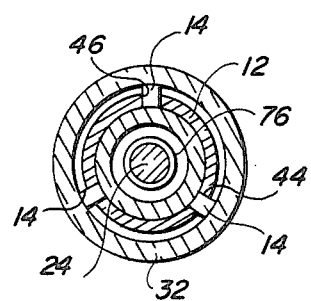
Figure 7:
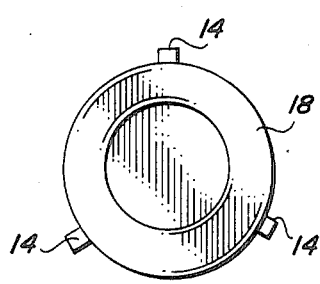
FIG. 7 is an end view of the tool disclosed in FIG. 4.
Figure 9:
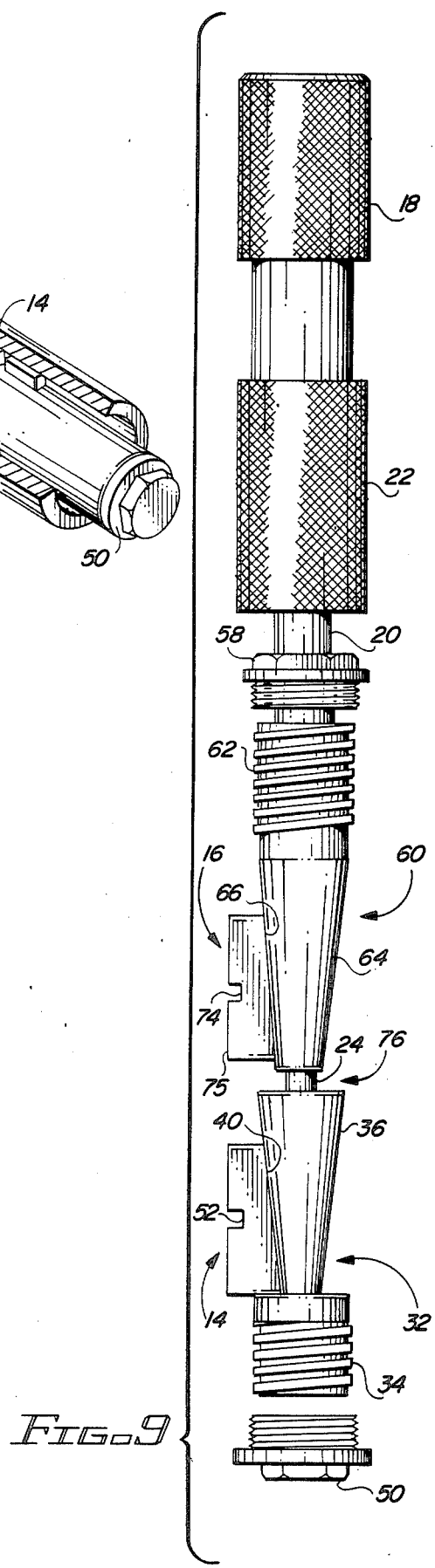
FIG. 9 is a side elevation view of part of the apparatus disclosed in the foregoing figures.

In FIG. 1, there is disclosed a flange aligning tool 10 made in accordance with the present invention. The flange aligner of FIG. 1 has a main body 12 which preferably is of annular configuration. Radially spaced about the main body 12 is a pipe engaging blade assembly 14. Axially spaced from the pipe engaging blade assembly is a flange engaging blade assembly 16. The details of the blade assemblies will be more fully discussed later on herein.

A circular knob 18 forms an actuating handle which can be rotated for radially extending the blades 14. The handle is supported by rotatable shaft 20. The rotatable shaft 20 is connected to be rotated by the circular knob 22 which is supported by the shaft 20 and knob 18 as well as the main body 12.

As seen in FIG. 4, together with other figures of the drawings, the knob 18 is connected to end 26 of the shaft 24 which extends through the before mentioned hollow shaft 20 and into the main body 12. The shaft 24 is therefore attached to the knob 18 and rotates within the hollow shaft 20. Numeral 28 indicates the hollow interior surface of shaft 20. Numeral 30 indicates the outer surface of the shaft 24 which is slidably received in a rotatable manner within the inner hollow surface 28 of hollow shaft 20.

Still looking at FIG. 4, together with other figures of the drawings, a pipe mandrel 32 has a threaded marginal end 34 separated from an opposed conical shaped marginal end 36, with there being a shoulder 37 formed therebetween. Pin 38 attaches the pipe mandrel 32 to the pipe shaft 24.

The pipe engaging blades 14 preferably are arranged 120° apart from one another and include a sloped inner edge 40 made complementary respective to the slope 36 of mandrel 32 so that the pipe engaging edge portion 42 of the blades 14 can be radially extended or retracted when the mandrel is moved along the longitudinal axial centerline of the tool, that is, moved axially. The blades have opposed sides 44 of a dimension to be reciprocatingly extended in a slidable manner through a slot or window 46 formed through the sidewall of the main body 12, there being a window 46 for each of the blades 14.

The pipe receiving marginal end of the main body is internally threaded at 48 for threadedly receiving the before mentioned threaded part 34 of the pipe mandrel. End cap 50 forms a closure member and a stop for the pipe end of the tool 10.

Each of the pipe blades 14 receive the illustrated groove 52 on the outer edge thereof which coincides and is aligned with a groove 54 formed about the circumferentially extending outer peripheral surface of the main body 12. The blade groove 52 coincides with the main body groove 54 so that the illustrated spring 74' seen lying with groove 54 also lies within groove 52 of the blades.

The flange marginal end of the main body 12 has formed therein an internal thread 56 which can be the same type of thread previously seen at 48. The flange end of the main body terminates in an apertured cap 58. The apertured cap 58 forms a closure member which is opposed to end cap 50. Cap 58 has a bore formed therethrough which rotatably receives hollow shaft 20 in close tolerance relationship therewith and aids in maintaining the concentric shafts 20 and 24 in perfect axial alignment.

Flange mandrel 60 is provided with male threaded surface area 62 along a marginal length thereof. The threads 62 are made complementary respective to the before mentioned female threaded area 56 of the main body. The flange mandrel includes a conical surface 64 at the other marginal end thereof, against which inclined surface 66 of the flange blades 16 are received.

Radially spaced flange windows 68 are spaced axially from the pipe windows 46. The flange windows 68 reciprocatingly receive the flange blades 16 therethrough, with the flange blades having opposed edges 70 slightly smaller than the length of the window 68. A groove 72 circumferentially extends about the main body in spaced, parallel relationship respective to the before mentioned groove 54. The groove 72 is aligned with groove 74 formed within each of the blade members 16. The illustrated spring 74' of the pipe engaging end of the tool.

An annular concial tapered acceptance cavity 76 is formed between the confronting marginal ends 78 and 80, respectively, of the pipe and flange mandrels, respectively, so that end 80 of the flange mandrel can be abuttingly received within the annular area formed by end 78 of the pipe mandrel and thereby form an internal stop for limiting the traveling of the mandrels toward one another.

The knob 22 is pinned at 82 to the outer or hollow shaft 20. The knob 18 is similarly rigidly attached to the internal shaft 26 by means of pin 38. Rotation of knob 18 rotates the internal shaft 24 and causes the pipe mandrel to move axially respective to the longitudinal axis of the main body. Knob 22 is independently rotatable respective to knob 18, and rotates the outer shaft 20 to cause the flange mandrel 60 to move axially respective to the main body 12. The threaded surfaces 34, 48 and 62, 56 preferably are all right-handed but can be otherwise as may be deemed desirable.

Numeral 84 indicates the sliding surface formed between the interior of knob 22 and the exterior of knob 18. Cavity 85 permits knob 18 to be partially received within knob 22 as the pipe mandrel and flange mandrel move toward one another.

In FIGS. 3 and 4, numeral 86 broadly indicates a flange while numeral 88 broadly indicates a pipe. Groove 90 formed between the flange and the pipe is a bevel which usually is provided to enable various different gaps to be achieved, depending upon the engineering specifications of the job. The gap provides a space for receiving electric welding which joins the two members together.

Numeral 92 indicates the inner face of cap 58 and is arranged in confronting relationship respective to face 94 of the flange mandrel so that the faces 92 and 94 can abut one another at the extreme end of travel of the flange mandrel. Numerals 96 and 98 indicate the confronting faces formed between the end cap 50 and the pipe mandrel 32. The confronting faces 96 and 98 provide a stop means for limiting the travel of the pipe mandrel 32 in one direction.

In order to enable the tool to be disassembled and serviced, it is preferable that the flange knob 18 be releasably attached to the inner shaft 24 at 26 and the inner shaft 24 be releasably attached to the pipe mandrel 32 at pin 38. The outer shaft 20 and the flange mandrel 60 can be made integral if desired.

Rotation of the pipe knob 18 rotates inner shaft 24 which in turn rotates the pipe mandrel 32 causing the threaded coacting surfaces 34, 48 to rotatably move the pipe mandrel 36 linearly along the longitudinal axis of the main body 12, thereby causing the coacting surfaces 36 and 40 to force the blade members 14 to slidably move through the windows 46, depending upon the direction of rotation of the pipe knob 18. This action moves the blades 14 laterally and thereby effectively increases the diameter of the tool, whereupon a means is provided by which one end of the tool can be centered in releasably attached relationship respective to a pipe 88 having an appropriate inside diameter that lies within the operating range of the tool.

The flange knob 22 likewise can be rotated independently of the pipe knob 18 in order to rotate the flange mandrel 60, whereupon the coacting threaded surfaces 56, 62 of the main body and mandrel cause the conical surface 64 of the flange mandrel to move along the longitudinal axial centerline of the main body 12. This action causes the coacting surfaces 64, 66 located between the cone and the blade 16 to radially move the blade through the window 68 in a direction depending upon the rotational directional of the flange knob 22. Accordingly, the effective diameter of the flange end of the main body 12 of the tool is changed in size to thereby engage the interior of a flange 86 so long as the inside diameter of the flange bore is within the working range of the tool.

FIG. 1, together with other figures of the drawings, illustrates a relatively small diameter flange aligning tool which can be used to accommodate a wide range of flange and pipe sizes, depending upon the construction of the two mandrels and the coacting blade assemblies.

FIG. 2 of the drawings indicates a relatively large flange aligning tool which likewise can accommodate a wide range of pipe and flange diameters, depending upon the design expedients employed for the two spaced mandrels and blade assemblies.

The present invention provides several different embodiments of a flange aligner tool which can advantageously be used to carry out a new method for attaching a flange to the end of a pipe by following the above described procedure.

The material of construction of the flange aligner of this invention can be of various different metals and plastics. Often a very lightweight non-magnetic, non-sparking tool is required, especially when working in hydrocarbon plants. In this instance, it is advantageous to make as many of the parts from aluminum and plastic as possible. Other applications call for a very strong and durable flange aligner, in which instance steel alloys can advantageously be employed as may be desired. A composite of steel, aluminum and plastic can be designed into the tool.

The axial alignment achieved with the tool of the present invention provides unexpected results in the ease with which a flange can be accurately positioned and oriented onto a pipe end. The design of the tool of the present invention maintains the pipe blades and flange blades aligned along the longitudinal axial centerline thereof in a manner heretofore not enjoyed by the prior art.

The accuracy and assembly time realized when using the present tool achieves an improved combination of assembled parts heretofore unknown to those skilled in the art.

I claim:

1. An alignment tool by which a flange can be held in axially aligned relationship respective to the end of a pipe, comprising:
   a main body, a first plurality of circumferentially spaced apart windows formed in one marginal end of said main body, a second plurality of windows formed through the opposed marginal end of said main body;
   a first mandrel received within said first marginal end of said main body, means for axially moving said mandrel, said mandrel having a conical surface formed on the exterior thereof, a blade having an inclined surface engaging said conical surface, and an opposed edge portion extending through said windows;
   a second mandrel having a conical surface formed on the exterior thereof, a second blade having an inclined surface engaging said conical surface, and an opposed edge portion extending through said second windows;
   means for moving said first and second mandrels toward and away from one another to thereby extend and retract said blades.

2. The tool of claim 1 wherein each said mandrel includes a threaded surface on a marginal length thereof, a threaded surface formed on the interior of said main body and made complementary respective to the threaded mandrel surface;
   an elongated shaft extending through said first mandrel into engagement with said second mandrel for rotating said second mandrel thereby causing the mandrel to move axially respective to said main body;
   an elongated shaft extending into engagement with said first mandrel for rotating said first mandrel thereby causing the mandrel to move axially respective to said main body.

3. The tool of claim 1 wherein there are three blade members spaced 120° apart for each mandrel;
   means by which said blade members are urged into sliding contact with the conical surface of a mandrel.

4. An alignment tool for aligning a flange with a pipe so that the flange and pipe can be welded together, said tool comprising:
   a main body; radially spaced extensible pipe engaging means extending from said main body for engaging the interior of a pipe; radially spaced extensible flange engaging means extending from said main body for engaging the interior of a flange;
   a first mandrel axially positioned within said main body and having a conical surface formed on a marginal length thereof;
   said pipe extensible means have an inclined surface formed thereon that engages the conical surface of said first mandrel so that axial movement of said first mandrel forces the pipe extensible means to move radially respective to said main body, thereby holding the main body in fixed relationship respective to a pipe to which the tool may be connected;
   said flange engaging means includes another mandrel axially positioned within said main body and having a conical surface formed on a marginal length thereof for engaging said radially spaced extensible flange engaging means so that axial movement of said another mandrel forces the flange extensible means to move radially respective to said main body thereby holding the main body in fixed relationship respective to a flange to which the tool may be connected;
   whereby said tool can be used for holding a flange in fixed relationship respective to the pipe.

5. The tool of claim 4 wherein each said first mandrel includes a threaded surface on a marginal length thereof; a threaded surface formed on the interior of said main body and made complementary respective to the threaded mandrel surface;
   an elongated shaft extending through said flange engaging means into engagement with said first mandrel for rotating said first mandrel thereby causing the mandrel to move axially respective to said main body;
   an elongated shaft extending to said flange engaging means and into engagement with said another mandrel for rotating said another mandrel thereby causing said another mandrel to move axially respective to said main body.

6. The tool of claim 4 wherein said pipe engaging means include blade members which radiate from said first mandrel; said main body has circumferentially spaced windows through which said blade members are reciprocatingly extended so that the blade members can extend from the main body into engagement with the interior wall of a pipe;
   wherein said main body has other circumferentially spaced windows axially spaced from the first recited windows through which other blade members are reciprocatingly extended so that the said other blade members can extend from the main body into engagement with the interior wall of a flange member.

7. The tool of claim 6 wherein there are three blade members spaced 120° apart from each mandrel;
   means by which the blade members of the pipe and flange engaging means are urged into sliding contact with the conical surface of a mandrel.

8. An aligning tool by which a first and a second hollow member can be axially aligned respective to one another; comprising:
   a main body having opposed marginal ends, a first plurality of radially arranged extensible members reciprocatingly received through said main body for engaging the inside wall surface of a first hollow member; a second plurality of radially arranged extensible members reciprocatingly received through said main body for engaging the inside wall surface of a second hollow member; said first and second plurality of extensible members are spaced axially from one another;
   a first mandrel means mounted for axial movement within said main body for reciprocating said first plurality of members in responses to axial movement of said first mandrel means; a second mandrel means mounted for axial movement within said main body for reciprocating said second plurality of members in response to axial movement of said second mandrel means independently of the first plurlaity of members;

first and second actuator means, respectively, located adjacent one said marginal end for independently moving said first and second mandrel means, respectively, and thereby extending and retracting said first and second plurality of members, respectively; whereby, said first plurality of members can be extended into fixed relationship to one of two members to be aligned, and thereafter the second of said plurality of members can be extended into fixed relationship respective to the other of the two members to be aligned, thereby axially aligning the two members.

9. The tool of claim 8 wherein each of said mandrels are axially positioned within said main body and includes a conical surface formed on a marginal length thereof;

said plurality of radially arranged extensible members extend radially through a sidewall of said main body and have an inclined surface formed thereon that engages the conical surface of the mandrel so that axial movement of the mandrel forces the extensible members into engagement with the interior of one of the two hollow members to be aligned, thereby holding the two hollow members in fixed relationship respective to one another.

10. The tool of claim 8 wherein each said mandrel includes a threaded surface on a marginal length thereof; a threaded surface forced on the interior of said main body and made complementary respective to the threaded mandrel surface;

an elongated shaft extending through said first mandrel into engagement with the second mandrel for rotating said second mandrel thereby causing the mandrel to move axially respective to said main body;

an elongated shaft extending into said main body into engagement with said second mandrel for rotating said second mandrel thereby causing the second mandrel to move axially respective to said main body.

11. The tool of claim 10 wherein said extensible members are blade members, said main body has circumferentially spaced windows through which said blade members are reciprocatingly extended so that the blade members can extend from the main body into engagement with the interior wall surface of one of the two members to be aligned;

wherein said main body has other circumferentially spaced windows through which other blade members are reciprocatingly extended so that the last said blade members can extend from the main body into engagement with the interior wall surface of the other of the two members to be aligned.

12. A flange aligner tool for independently engaging the interior wall surface of a flange and a pipe and aligning the flange with the pipe so that the flange and pipe can be welded together, said tool comprising:

a main body having an axial bore; radially extending pipe engaging means extending from said main body for engaging the interior of a pipe; said radially extending pipe engaging means includes a mandrel mounted for axial movement within said main body and having a conical surface formed on a marginal length thereof;

a plurality of extensible members extending through said main body and having an inclined surface that engages the conical surface of said mandrel so that axial movement of said mandrel forces the extensible members into engagement with the interior of a pipe, thereby holding the main body in fixed relationship respective to the pipe;

radially extending flange engaging means axially spaced from said pipe engaging means and extending from said main body for engaging the interior of a flange; said flange engaging means includes a flange mandrel mounted for axial movement within said main body and having a conical surface formed on a marginal length thereof;

another plurality of extensible members extending through said main body and having an inclined surface that engages the conical surface of the flange mandrel so that axial movement of the flange mandrel forces the extensible members into engagement with the interior of a flange, thereby holding a flange in fixed relationship respective to a pipe;

and means for moving each of the recited mandrels independently of one another.

13. The tool of claim 12 wherein said pipe engaging means include blade members which radiate from said first mandrel; said main body has circumferentially spaced windows through which said blade members are reciprocatingly extended so that the blade members can extend from the main body into engagement with the interior wall of a pipe;

wherein said main body has other circumferentially spaced windows axially spaced from the first recited windows through which other blade members are reciprocatingly extended so that the said other blade members can extend from the main body into engagement with the interior wall of a flange member.

* * * * *